(12) United States Patent
Greaves

(10) Patent No.: US 6,231,178 B1
(45) Date of Patent: May 15, 2001

(54) PROTECTIVE SUNGLASSES SYSTEM HAVING REMOVABLE PRESCRIPTION CAPABLE LENSES

(76) Inventor: Jon C. Greaves, 29638 Del Rey Rd., Temecula, CA (US) 92591

( * ) Notice: Subject to any disclaimer, the term of this patent is extended or adjusted under 35 U.S.C. 154(b) by 0 days.

(21) Appl. No.: 09/502,308

(22) Filed: Feb. 11, 2000

(51) Int. Cl.[7] .................................................. G02C 7/10
(52) U.S. Cl. ............................................ 351/44; 2/12; 2/13
(58) Field of Search ................................ 381/44, 41, 47, 381/57, 48, 58, 111; 2/10, 12, 13

(56) References Cited

U.S. PATENT DOCUMENTS

| | | |
|---|---|---|
| D. 366,493 | 1/1996 | Magdelaine et al. |
| 2,423,539 | 7/1947 | Williams . |
| 4,057,852 | 11/1977 | Contant . |
| 4,859,048 * | 8/1989 | Jannard ................................. 351/47 |
| 5,016,292 | 5/1991 | Rademacher . |
| 5,300,963 * | 4/1994 | Tanaka .................................. 351/44 |
| 5,390,369 | 2/1995 | Tubin . |
| 5,519,460 | 5/1996 | Mills . |

* cited by examiner

Primary Examiner—Hung Xuan Dang

(57) ABSTRACT

A prescription capable sunglasses for enhancing protection from light penetration leading to improved visual acuity. The prescription capable sunglasses includes a pair of ultraviolet lens, a metal frame having a pair of lens retaining portions, a first and second side portions, and a first and second temple ear pieces, and further includes a first and second light-blocking members removably attached to the first and second side portions respectively, and also includes a shield member compressively attached to and extending along the top of the frame and having a padded member at an outer edge thereof for cushioning the user forehead, and further includes a padded nose bridge member attachable between the lens retaining portions.

10 Claims, 2 Drawing Sheets

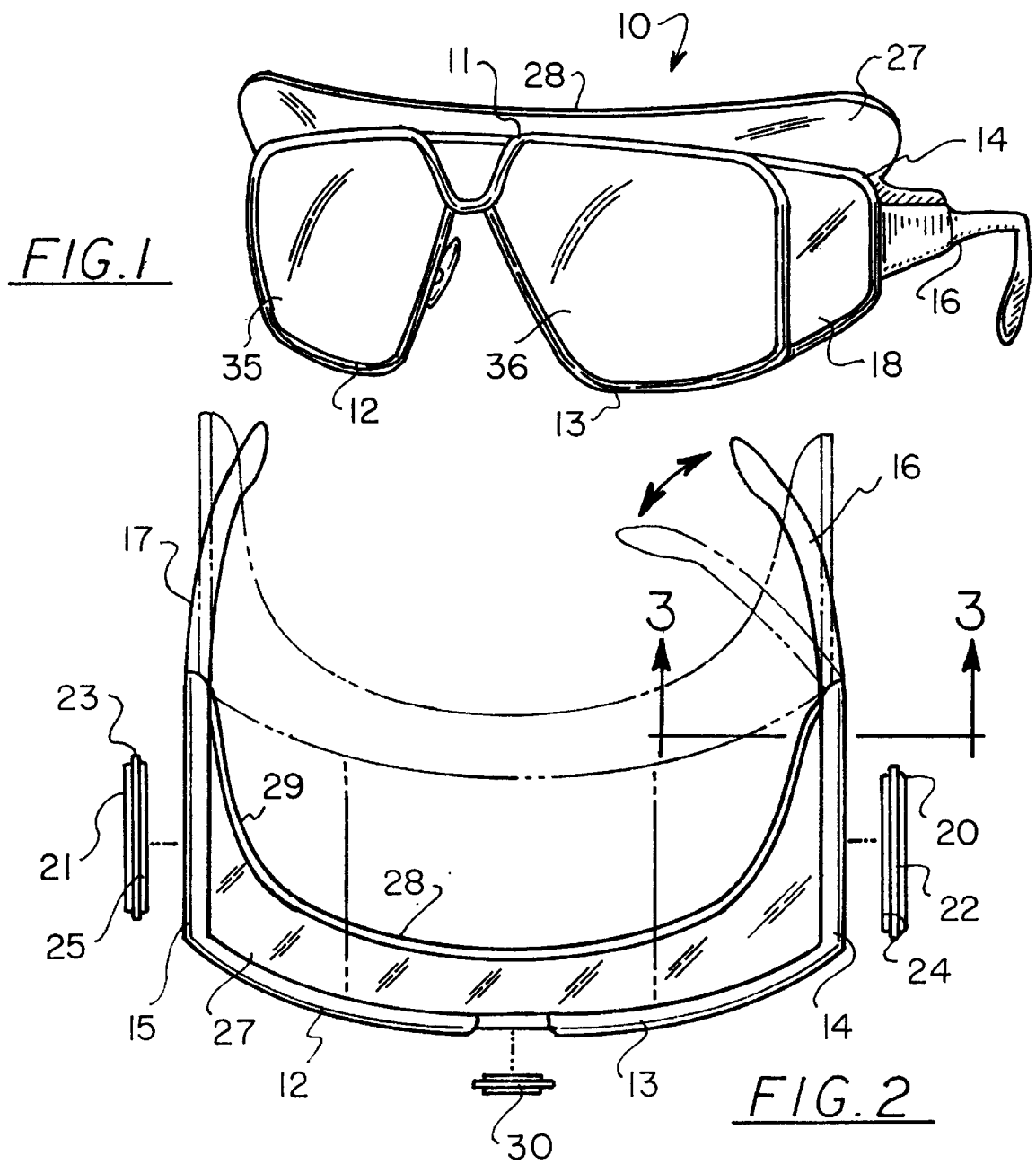

PROTECTIVE SUNGLASSES SYSTEM HAVING REMOVABLE PRESCRIPTION CAPABLE LENSES

BACKGROUND OF THE INVENTION

1. Field of the Invention

The present invention relates to ultra-light-blocking sunglasses and more particularly pertains to a new prescription capable sunglasses for enhancing protection from light penetration leading to improved visual acuity.

2. Description of the Prior Art

The use of ultra-light-blocking sunglasses is known in the prior art. More specifically, ultra-light-blocking sunglasses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,519,460; U.S. Pat. No. 5,016,292; U.S. Pat. No. 5,390,369; U.S. Pat. No. 4,057,862; U.S. Pat. No. 2,423,539; and U.S. Pat. No. 366,493.

While these devices fulfill their respective, particular objectives and requirements, the aforementioned patents do not disclose a new prescription capable sunglasses with features that shield light to the eyes from all directions. The inventive device includes a pair of ultraviolet lens, a frame having a pair of lens retaining portions, a first and second side portions, and a first and second elongate ear pieces, and further includes a first and second light-blocking members removably attached to the first and second side portions respectively, and also includes a shield member securely attached to and extending along a top of the frame and having a padded member at an outer edge thereof for cushioning the user forehead, and further includes a padded nose bridge member attachable between the lens retaining portions.

In these respects, the prescription capable sunglasses according to the present invention substantially departs from the conventional concepts and designs of the prior art, and in so doing provides an apparatus primarily developed for the purpose of enhancing protection from light penetration leading to improved visual acuity.

SUMMARY OF THE INVENTION

In view of the foregoing disadvantages inherent in the known types of ultra-light-blocking sunglasses now present in the prior art, the present invention provides a new prescription capable sunglasses construction wherein the same can be utilized for enhancing protection from light penetration leading to improved visual acuity.

The general purpose of the present invention, which will be described subsequently in greater detail, is to provide a new prescription capable sunglasses apparatus and method which has many of the advantages of the ultra-light-blocking sunglasses mentioned heretofore and many novel features that result in a new prescription capable sunglasses which is not anticipated, rendered obvious, suggested, or even implied by any of the prior art ultra-light-blocking sunglasses, either alone or in any combination thereof.

To attain this, the present invention generally comprises a pair of ultraviolet lens, a metal frame having a pair of lens retaining portions, a first and second side portions, and a first and second elongate ear pieces, and further includes a first and second light-blocking members removably attached to the first and second side portions respectively, and also includes a shield member securely attached to and extending along a top of the frame and having a padded member at an outer edge thereof for cushioning the user forehead, and further includes a padded nose bridge member attachable between the lens retaining portions. The metal frame allows for the shield member to be placed over the frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new prescription capable sunglasses apparatus and method which has many of the advantages of the ultra-light-blocking sunglasses mentioned heretofore and many novel features that result in a new prescription capable sunglasses which is not anticipated, rendered obvious, suggested, or even implied by any of the prior art ultra-light-blocking sunglasses, either alone or in any combination thereof.

It is another object of the present invention to provide a new prescription capable sunglasses which may be easily and efficiently manufactured and marketed.

It is a further object of the present invention to provide a new prescription capable sunglasses which is of a durable and reliable construction.

An even further object of the present invention is to provide a new prescription capable sunglasses which is susceptible of a low cost of manufacture with regard to both materials and labor, and which accordingly is then susceptible of variable range of prices of sale to the consuming public, thereby making such prescription capable sunglasses economically available to the buying public.

Still yet another object of the present invention is to provide a new prescription capable sunglasses which provides in the apparatuses and methods of the prior art some of the advantages thereof, while simultaneously overcoming some of the disadvantages normally associated therewith.

Still another object of the present invention is to provide a new prescription capable sunglasses for enhancing protection from light penetration leading to improved visual acuity.

Yet another object of the present invention is to provide a new prescription capable sunglasses which includes a pair of ultraviolet lens, a frame having a pair of lens retaining portions, a first and second side portions, and a first and second elongate ear pieces, and further includes a first and second light-blocking members removably attached to the first and second side portions respectively, and also includes a shield member securely attached to and extending along a top of the frame and having a padded member at an outer edge thereof for cushioning the user forehead, and further includes a padded nose bridge member attachable between the lens retaining portions.

Still yet another object of the present invention is to provide a new prescription capable sunglasses that shields and blocks light not only through the sides but also through the top between a person's forehead and the frame.

Even still another object of the present invention is to provide a new prescription capable sunglasses that is versatile and can be worn by anybody.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new prescription capable sunglasses according to the present invention.

FIG. 2 is a top plan view of the present invention.

DESCRIPTION OF THE PREFERRED EMBODIMENT

Figure 3:
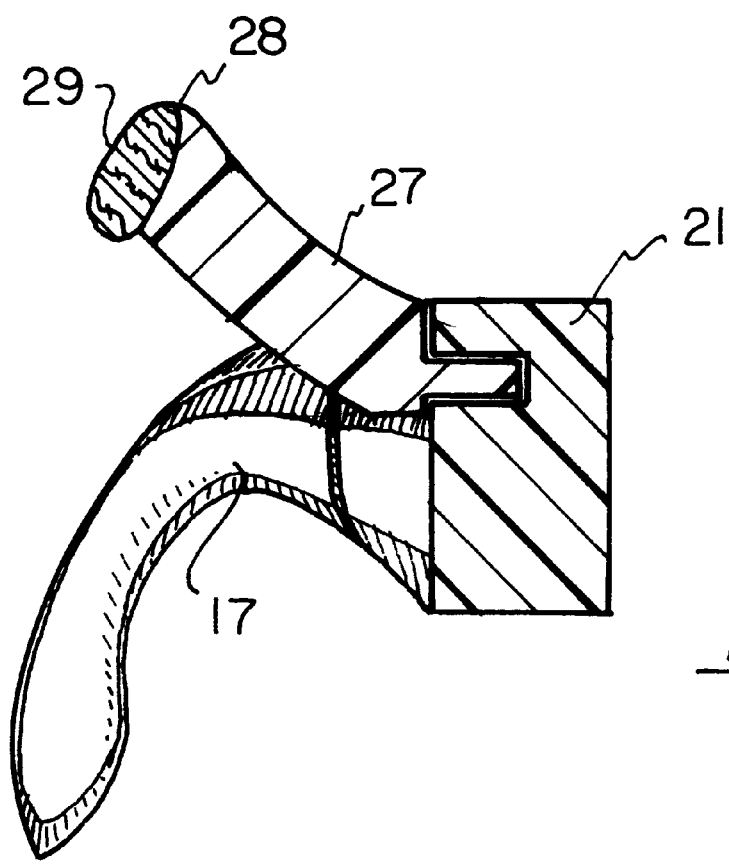
FIG. 3 is a side elevational view of the present invention.

With reference now to the drawings, and in particular to FIGS. 1 through 3 thereof, a new prescription capable sunglasses embodying the principles and concepts of the present invention and generally designated by the reference numeral 10 will be described.

As best illustrated in FIGS. 1 through 3, the prescription capable sunglasses 10 generally comprises a pair of ultraviolet blocking lens 35,36, and a metal frame 11 having a front, a pair of lens retainer portions 12,13 disposed in the front and each having an opening therethrough. The frame 11 also includes a first side portion 14 integrally extending from a first one of the lens retainer portions 13, and a second side portion 15 integrally extending from a second one of the lens retainer portions 12. A first elongate ear piece 16 is connected to the first side portion 14, and a second elongate ear piece 17 is connected to the second side portion 15. Each of the side portions 14,15 has an opening 18 therethrough. The first elongate ear piece 16 is hingedly attached to the end of the first side portion 14, and the second elongate ear piece 17 is hingedly attached to the end of the second side portion 15.

The prescription capable sunglasses 10 also includes a pair of light blocking members 20,21 one of which is removably and conventionally retained in the first side portion 14 and the other of which is removably retained in the second side portion 15. Each of the light blocking members 20,21 includes a wall 22,23 and a flange 24,25 integrally attached to and extending outwardly therefrom. The flange 24,25 is adapted to engage a respective one of the first and second side portions 14,15 to substantially secure the light blocking member to the frame 11 and over the opening 18 of the side portion 14.

A shield member 27 is securely compressed along a top of the frame 11 and extends rearwardly so as to generally block light from getting into a user's eyes between a user's head and the top of the frame 11. The shield member 11 begins along the first side portion 14 and extends across the top of the frame 11 and terminates along the second side portion 14. The shield member 27 has an outer edge 28 and a padded member 29 which is crimped to and along the outer edge 28. The padded member 29 is in contactable relationship to a user's head when the prescription capable sunglasses 10 are being worn by the user to substantially provide cushion and comfort to the user's head. The shield member 27 is essentially a plastic piece of snap-in-place material which is the same as the first and second light-blocking members 20,21. A padded nose bridge member 30 is removably and conventionally secured to the frame 11 between the lens retainer portions 12,13 to provide padding about the user's nose when the prescription capable sunglasses 10 are being worn by the user.

In use, the user places the first and second temple ear pieces 16,17 over his/her ears with the shield member 27 contacting the user's forehead. The prescription capable sunglasses 10 substantially encloses about the user's eyes to prevent light from reaching the eyes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A protective sunglasses system having removable prescription capable lenses comprising:

a pair of ultraviolet blocking lens;

a frame having a front, a pair of lens retainer portions in said front, a first side portion extending rearwardly from a first one of said lens retainer portions, a second side portion extending rearwardly from a second one of said lens retainer portions, a first ear piece connected to said first side portion, and a second ear piece connected to said second side portion, each of said ear pieces and each of said side portions having a length, the length of each of said side portions being substantially equal to the length of each of said ear pieces;

a pair of light blocking members one of which is removably retained in said first side portion and the other of which is removably retained in said second side portion, each of said pair of light blocking members extending an entire distance of each of said side portions for maximizing the peripheral area viewable through said side portions for maximizing light blocking capabilities from the sides;

a shield member attached along a top of said frame and extending rearwardly so as to block light from getting into a user's eyes between a user's head and said top of said frame, each of said pair of light blocking members being removable from said frame without removing said shield member and said shield member being removable without removing said light blocking members; and a padded nose bridge member removably secured to said frame between said lens retainer portions.

2. A protective sunglasses system having removable prescription capable lenses as described in claim 1, wherein each of said side portions includes an opening therethrough for removably receiving one of said light blocking members.

3. A protective sunglasses system having removable prescription capable lenses as described in claim 1, wherein each of said light blocking members includes a wall and a flange integrally attached to and extending outwardly therefrom, said flange being adapted to engage a respective one of said first and said second side portions to substantially secure said light blocking member to said frame and over an opening in said side portion.

4. A protective sunglasses system having removable prescription capable lenses as described in claim 1, wherein said shield member extends along said first side portion and extends along said top of said frame and extends along said second side portion.

5. A protective sunglasses system having removable prescription capable lenses as described in claim 1, wherein said shield member has an outer edge and a padded member being compressed to and along said outer edge, said padded member being in contactable relationship to a user's head when said frame is being worn by the user to provide cushion and comfort to the user's head.

6. A protective sunglasses system having removable prescription capable lenses as described in claim 1, which said shield member is a piece of plastic material.

7. A protective sunglasses system having removable prescription capable lenses as described in claim 1, wherein said first ear piece is pivotally attached to said end of said first side portion, and said temple ear piece is pivotally attached to said end of said second side portion.

8. A protective sunglasses system having removable prescription capable lenses as described in claim 1, wherein said ultraviolet blocking lenses are capable of being ground to a specific prescription for corrective vision.

9. A protective sunglasses system having removable prescription capable lenses as described in claim 1, wherein said light blocking members are clear for night vision.

10. A protective sunglasses system having removable prescription capable lenses comprising:

a pair of ultraviolet blocking lens;

a frame having a front, a pair of lens retainer portions in said front, a first side portion extending from a first one of said lens retainer portions, a second side portion extending from a second one of said lens retainer portions, a first temple ear piece connected to said first side portion, and a second temple ear piece connected to said second side portion, each of said side portions including an opening therethrough, said second temple ear piece being hingedly attached to said end of said second side portion, each of said ear pieces having a length, each of said ear pieces having a joint at approximately halfway of the length for allowing the glasses to cover a greater peripheral view;

a pair of light blocking members one of which is removably retained in said first side portion and the other of which is removably retained in said second side portion, each of said light blocking members including a wall and a flange integrally attached to and extending outwardly therefrom, said flange being adapted to engage a respective one of said first and said second side portions to substantially secure said light blocking member to said frame and over said opening, said first temple ear piece being hingedly attached to said end of said first side portion, each of said pair of light blocking members extending an entire distance of each of said side portions;

a shield member attached along a top of said frame and extending rearwardly so as to generally block light from getting into a user's eyes between a user's head and said top of said frame, said shield member beginning along said first side portion and extending along said top of said frame and terminating along said second side portion, said shield member having an outer edge and a padded member securely connected to and along said outer edge, said padded member being in contactable relationship to a user's head when said prescription capable sunglasses are being worn by the user to substantially provide cushion and comfort to the user's head, said shield member being a piece of plastic material; and a padded nose bridge member removably secured to said frame between said lens retainer portions.

* * * * *